(12) United States Patent
Frederick (10) Patent No.: US 8,169,312 B2
(45) Date of Patent: May 1, 2012

(54) DETERMINING SPEEDS OF RADIO FREQUENCY TAGS

(75) Inventor: Thomas J. Frederick, Chapel Hill, NC (US)

(73) Assignee: Sirit Inc., Toronto (CA)

( * ) Notice: Subject to any disclaimer, the term of this patent is extended or adjusted under 35 U.S.C. 154(b) by 630 days.

(21) Appl. No.: 12/351,139

(22) Filed: Jan. 9, 2009

(65) Prior Publication Data
US 2010/0176921 A1 Jul. 15, 2010

(51) Int. Cl.
*B60Q 1/00* (2006.01)
*G08G 1/01* (2006.01)

(52) U.S. Cl. ....... 340/441; 340/928; 340/936; 340/10.1; 342/104

(58) Field of Classification Search .................. 340/441, 340/928, 936
See application file for complete search history.

(56) References Cited

U.S. PATENT DOCUMENTS

| | | |
|---|---|---|
| 3,568,197 A | 3/1971 | Cubley |
| 3,663,932 A | 5/1972 | Mount et al. |
| 3,688,250 A | 8/1972 | Howlett |
| 3,696,429 A | 10/1972 | Tressa |
| 3,876,946 A | 4/1975 | La Clair et al. |
| 3,984,835 A | 10/1976 | Kaplan et al. |
| 4,243,955 A | 1/1981 | Daniel et al. |
| 4,297,672 A | 10/1981 | Furchey et al. |
| 4,325,057 A | 4/1982 | Bishop |
| 4,509,123 A | 4/1985 | Vereen |
| 4,595,915 A | 6/1986 | Close |
| 4,849,706 A | 7/1989 | Davis et al. |
| 4,857,925 A | 8/1989 | Brubaker |
| 4,870,391 A | 9/1989 | Cooper |
| 4,873,529 A | 10/1989 | Gibson |
| 4,903,033 A | 2/1990 | Tsao et al. |
| 4,968,967 A | 11/1990 | Stove |
| 5,012,225 A | 4/1991 | Gill |
| 5,021,780 A | 6/1991 | Fabiano et al. |
| 5,038,283 A | 8/1991 | Caveney |
| 5,095,536 A | 3/1992 | Loper |
| 5,165,109 A | 11/1992 | Han et al. |
| 5,278,563 A | 1/1994 | Spiess |
| 5,278,569 A | 1/1994 | Ohta et al. |

(Continued)

FOREIGN PATENT DOCUMENTS

CA 2218269 4/1999

(Continued)

OTHER PUBLICATIONS

International Search Report and Written Opinion of the International Searching Authority, PCT/US2010/020475, mailed Mar. 11, 2010, 11 pages.

(Continued)

*Primary Examiner* — Donnie Crosland
(74) *Attorney, Agent, or Firm* — Fish & Richardson P.C.

(57) ABSTRACT

The present disclosure is directed to determining speeds of radio frequency tags. In some implementations, a method includes sampling a Radio Frequency (RF) signal from an RFID tag at a plurality of different times as the RFID tag approaches an RFID reader and recedes from the RFID reader. A phase of the RF signal is determined for each of the plurality of different times based, at least in part, on the sampled RF signal. A speed of the RFID tag is determined based, at least in part, on the determined phase for the sampled signal for each of the plurality of different times.

17 Claims, 5 Drawing Sheets

U.S. PATENT DOCUMENTS

| | | | |
|---|---|---|---|
| 5,293,408 | A | 3/1994 | Takahashi et al. |
| 5,334,822 | A | 8/1994 | Sanford |
| 5,381,157 | A | 1/1995 | Shiga |
| 5,396,489 | A | 3/1995 | Harrison |
| 5,430,441 | A | 7/1995 | Bickley et al. |
| 5,444,864 | A | 8/1995 | Smith |
| 5,461,374 | A | 10/1995 | Lewiner et al. |
| 5,477,215 | A | 12/1995 | Mandelbaum |
| 5,495,500 | A | 2/1996 | Jovanovich et al. |
| 5,506,584 | A | 4/1996 | Boles |
| 5,519,729 | A | 5/1996 | Jurisch et al. |
| 5,539,394 | A | 7/1996 | Cato et al. |
| 5,608,379 | A | 3/1997 | Narlow et al. |
| 5,613,216 | A | 3/1997 | Galler |
| 5,630,072 | A | 5/1997 | Dobbins |
| 5,648,767 | A | 7/1997 | O'Connor et al. |
| 5,649,295 | A | 7/1997 | Shober et al. |
| 5,661,485 | A | 8/1997 | Manuel |
| 5,661,494 | A | 8/1997 | Bondyopadhyay |
| 5,668,558 | A | 9/1997 | Hong |
| 5,708,423 | A | 1/1998 | Ghaffari et al. |
| 5,729,576 | A | 3/1998 | Stone et al. |
| 5,745,037 | A | 4/1998 | Guthrie et al. |
| 5,777,561 | A | 7/1998 | Chieu et al. |
| 5,784,414 | A | 7/1998 | Bruekers et al. |
| 5,825,753 | A | 10/1998 | Betts et al. |
| 5,831,578 | A | 11/1998 | Lefevre |
| 5,841,814 | A | 11/1998 | Cupo |
| 5,850,187 | A | 12/1998 | Carrender et al. |
| 5,861,848 | A | 1/1999 | Iwasaki |
| 5,892,396 | A | 4/1999 | Anderson et al. |
| 5,898,405 | A | 4/1999 | Iwasaki |
| 5,905,405 | A | 5/1999 | Ishizawa |
| 5,940,006 | A | 8/1999 | MacLellan et al. |
| 5,974,301 | A | 10/1999 | Palmer et al. |
| 6,025,780 | A | 2/2000 | Bowers et al. |
| 6,026,378 | A | 2/2000 | Onozaki |
| 6,084,530 | A | 7/2000 | Pidwerbetsky et al. |
| 6,094,149 | A | 7/2000 | Wilson |
| 6,107,910 | A | 8/2000 | Nysen |
| 6,121,929 | A | 9/2000 | Olson et al. |
| 6,137,447 | A | 10/2000 | Saitoh et al. |
| 6,177,861 | B1 | 1/2001 | MacLellan et al. |
| 6,192,225 | B1 | 2/2001 | Arpaia et al. |
| 6,219,534 | B1 | 4/2001 | Torii |
| 6,229,817 | B1 | 5/2001 | Fischer et al. |
| 6,229,987 | B1 | 5/2001 | Greeff et al. |
| 6,232,837 | B1 | 5/2001 | Yoo et al. |
| 6,275,192 | B1 | 8/2001 | Kim |
| 6,317,027 | B1 | 11/2001 | Watkins |
| 6,320,542 | B1 | 11/2001 | Yamamoto et al. |
| 6,356,230 | B1 * | 3/2002 | Greef et al. ........... 342/127 |
| 6,366,216 | B1 | 4/2002 | Olesen |
| 6,412,086 | B1 | 6/2002 | Friedman et al. |
| 6,414,626 | B1 | 7/2002 | Greef et al. |
| 6,442,276 | B1 | 8/2002 | Doljack |
| 6,456,668 | B1 | 9/2002 | MacLellan et al. |
| 6,459,687 | B1 | 10/2002 | Bourlas et al. |
| 6,466,130 | B2 | 10/2002 | Van Horn et al. |
| 6,492,933 | B1 | 12/2002 | McEwan |
| 6,501,807 | B1 | 12/2002 | Chieu et al. |
| 6,531,957 | B1 | 3/2003 | Nysen |
| 6,538,564 | B1 | 3/2003 | Cole |
| 6,566,997 | B1 | 5/2003 | Bradin |
| 6,567,648 | B1 | 5/2003 | Ahn et al. |
| 6,603,391 | B1 | 8/2003 | Greeff et al. |
| 6,639,509 | B1 | 10/2003 | Martinez |
| 6,700,547 | B2 | 3/2004 | Mejia et al. |
| 6,714,121 | B1 | 3/2004 | Moore |
| 6,714,133 | B2 | 3/2004 | Hum et al. |
| 6,768,441 | B2 | 7/2004 | Singvall et al. |
| 6,774,685 | B2 | 8/2004 | O'Toole et al. |
| 6,784,789 | B2 | 8/2004 | Eroglu et al. |
| 6,794,000 | B2 | 9/2004 | Adams et al. |
| 6,798,384 | B2 | 9/2004 | Aikawa et al. |
| 6,816,125 | B2 | 11/2004 | Kuhns et al. |
| 6,819,938 | B2 | 11/2004 | Sahota |
| 6,831,603 | B2 | 12/2004 | Menache |
| 6,838,989 | B1 | 1/2005 | Mays et al. |
| 6,888,509 | B2 | 5/2005 | Atherton |
| 6,974,928 | B2 | 12/2005 | Boom |
| 7,009,496 | B2 | 3/2006 | Arneson et al. |
| 7,034,689 | B2 | 4/2006 | Teplitxky et al. |
| 7,039,359 | B2 | 5/2006 | Martinez |
| 7,043,269 | B2 | 5/2006 | Ono et al. |
| 7,053,755 | B2 | 5/2006 | Atkins et al. |
| 7,058,368 | B2 | 6/2006 | Nicholls et al. |
| 7,084,769 | B2 | 8/2006 | Bauer et al. |
| 7,088,248 | B2 | 8/2006 | Forster |
| 7,091,828 | B2 | 8/2006 | Greeff et al. |
| 7,095,324 | B2 | 8/2006 | Conwell et al. |
| 7,095,985 | B1 | 8/2006 | Hofmann |
| 7,099,406 | B2 | 8/2006 | Najarian et al. |
| 7,099,671 | B2 | 8/2006 | Liang |
| 7,100,835 | B2 | 9/2006 | Selker |
| 7,109,867 | B2 | 9/2006 | Forster |
| 7,155,172 | B2 | 12/2006 | Scott |
| 7,180,402 | B2 | 2/2007 | Carrender et al. |
| 7,197,279 | B2 | 3/2007 | Bellantoni |
| 7,199,713 | B2 | 4/2007 | Barink et al. |
| 7,215,976 | B2 | 5/2007 | Brideglall |
| 7,221,900 | B2 | 5/2007 | Reade et al. |
| 7,256,682 | B2 | 8/2007 | Sweeney, II |
| 7,257,079 | B1 | 8/2007 | Bachrach |
| 7,284,703 | B2 | 10/2007 | Powell et al. |
| 7,357,299 | B2 | 4/2008 | Frerking |
| 7,375,634 | B2 | 5/2008 | Sprague |
| 7,385,511 | B2 | 6/2008 | Muchkaev |
| 7,388,468 | B2 | 6/2008 | Diorio et al. |
| 7,388,501 | B2 | 6/2008 | Tang et al. |
| 7,409,194 | B2 | 8/2008 | Shi et al. |
| 7,411,505 | B2 | 8/2008 | Smith et al. |
| 7,413,124 | B2 | 8/2008 | Frank et al. |
| 7,429,953 | B2 | 9/2008 | Buris et al. |
| 7,432,817 | B2 | 10/2008 | Phipps et al. |
| 7,432,874 | B2 | 10/2008 | Meissner |
| 7,440,743 | B2 | 10/2008 | Hara et al. |
| 7,450,919 | B1 | 11/2008 | Chen et al. |
| 7,460,014 | B2 | 12/2008 | Pettus |
| 7,477,887 | B2 | 1/2009 | Youn |
| 7,479,874 | B2 | 1/2009 | Kim et al. |
| 7,492,812 | B2 | 2/2009 | Ninomiya et al. |
| 7,526,266 | B2 | 4/2009 | Al-Mahdawi |
| 7,548,153 | B2 | 6/2009 | Gravelle et al. |
| 7,551,085 | B2 | 6/2009 | Pempsell et al. |
| 7,557,762 | B2 | 7/2009 | Shimasaki et al. |
| 7,561,866 | B2 | 7/2009 | Oliver et al. |
| 7,562,083 | B2 | 7/2009 | Smith et al. |
| 7,570,164 | B2 | 8/2009 | Chakraborty et al. |
| 7,576,657 | B2 | 8/2009 | Duron et al. |
| 7,580,378 | B2 | 8/2009 | Carrender et al. |
| 7,583,179 | B2 | 9/2009 | Wu et al. |
| 7,586,416 | B2 | 9/2009 | Ariyoshi et al. |
| 7,592,898 | B1 | 9/2009 | Ovard et al. |
| 7,592,915 | B2 | 9/2009 | Liu |
| 7,594,153 | B2 | 9/2009 | Kim et al. |
| 7,595,729 | B2 | 9/2009 | Ku et al. |
| 7,596,189 | B2 | 9/2009 | Yu et al. |
| 7,606,532 | B2 | 10/2009 | Wuidart |
| 7,609,163 | B2 | 10/2009 | Shafer |
| 7,612,675 | B2 | 11/2009 | Miller et al. |
| 7,944,356 | B2 * | 5/2011 | Tuttle ................ 340/572.1 |
| 2001/0048715 | A1 | 12/2001 | Lee et al. |
| 2002/0021208 | A1 | 2/2002 | Nicholson et al. |
| 2002/0024448 | A1 * | 2/2002 | Olesen ............. 340/825.49 |
| 2002/0060640 | A1 * | 5/2002 | Davis et al. ............ 342/104 |
| 2002/0067264 | A1 | 6/2002 | Soehnlen |
| 2002/0072344 | A1 | 6/2002 | Souissi |
| 2002/0119748 | A1 | 8/2002 | Prax et al. |
| 2002/0141347 | A1 | 10/2002 | Harp et al. |
| 2003/0021367 | A1 | 1/2003 | Smith |
| 2003/0052161 | A1 | 3/2003 | Rakers et al. |
| 2003/0228860 | A1 | 12/2003 | Jou |
| 2004/0174294 | A1 * | 9/2004 | Arnold et al. ............ 342/104 |
| 2005/0084003 | A1 | 4/2005 | Duron et al. |
| 2005/0099270 | A1 | 5/2005 | Diorio et al. |
| 2005/0099340 | A1 | 5/2005 | Suzuki |

| | | | |
|---|---|---|---|
| 2005/0107051 A1 | 5/2005 | Aparin et al. | |
| 2005/0114326 A1 | 5/2005 | Smith et al. | |
| 2005/0116867 A1 | 6/2005 | Park et al. | |
| 2005/0156031 A1 | 7/2005 | Goel et al. | |
| 2005/0179520 A1 | 8/2005 | Ziebertz | |
| 2005/0237843 A1 | 10/2005 | Hyde | |
| 2005/0259768 A1 | 11/2005 | Yang et al. | |
| 2006/0022800 A1 | 2/2006 | Krishna et al. | |
| 2006/0086809 A1 | 4/2006 | Shanks et al. | |
| 2006/0098765 A1 | 5/2006 | Thomas et al. | |
| 2006/0103533 A1 | 5/2006 | Pahlavan et al. | |
| 2006/0125603 A1 | 6/2006 | Nahear | |
| 2006/0132313 A1 | 6/2006 | Moskowitz | |
| 2006/0183454 A1 | 8/2006 | Al-Mahdawi | |
| 2006/0214773 A1 | 9/2006 | Wagner et al. | |
| 2006/0238302 A1 | 10/2006 | Loving et al. | |
| 2006/0252398 A1 | 11/2006 | Park et al. | |
| 2006/0267734 A1 | 11/2006 | Taki et al. | |
| 2006/0290502 A1 | 12/2006 | Rawlings | |
| 2007/0001809 A1 | 1/2007 | Kodukula et al. | |
| 2007/0001813 A1 | 1/2007 | Maguire et al. | |
| 2007/0018792 A1 | 1/2007 | Take et al. | |
| 2007/0023520 A1* | 2/2007 | Miyashita | 235/451 |
| 2007/0046432 A1 | 3/2007 | Aiouaz et al. | |
| 2007/0060075 A1 | 3/2007 | Mikuteit | |
| 2007/0082617 A1 | 4/2007 | McCallister | |
| 2007/0133392 A1 | 6/2007 | Shin et al. | |
| 2007/0139200 A1 | 6/2007 | Yushkov et al. | |
| 2007/0164868 A1 | 7/2007 | Deavours et al. | |
| 2007/0188305 A1 | 8/2007 | Drucker | |
| 2007/0206704 A1 | 9/2007 | Zhou et al. | |
| 2007/0206705 A1 | 9/2007 | Stewart | |
| 2007/0222604 A1 | 9/2007 | Phipps et al. | |
| 2007/0222606 A1 | 9/2007 | Phipps et al. | |
| 2007/0236335 A1 | 10/2007 | Aiouaz et al. | |
| 2007/0285238 A1 | 12/2007 | Batra | |
| 2007/0290846 A1 | 12/2007 | Schilling et al. | |
| 2008/0012688 A1 | 1/2008 | Ha et al. | |
| 2008/0018431 A1 | 1/2008 | Turner et al. | |
| 2008/0048867 A1 | 2/2008 | Oliver et al. | |
| 2008/0049870 A1 | 2/2008 | Shoarinejad et al. | |
| 2008/0065957 A1 | 3/2008 | Shoarinejad et al. | |
| 2008/0068173 A1 | 3/2008 | Alexis et al. | |
| 2008/0084310 A1 | 4/2008 | Nikitin et al. | |
| 2008/0136595 A1 | 6/2008 | Finkenzeller | |
| 2008/0143486 A1 | 6/2008 | Downie et al. | |
| 2008/0191961 A1 | 8/2008 | Tuttle | |
| 2008/0258916 A1 | 10/2008 | Diorio et al. | |
| 2008/0278286 A1 | 11/2008 | Takaluoma et al. | |
| 2009/0022067 A1 | 1/2009 | Gotwals | |
| 2009/0053996 A1 | 2/2009 | Enguent et al. | |
| 2009/0091454 A1 | 4/2009 | Tuttle | |
| 2009/0096612 A1 | 4/2009 | Seppa et al. | |
| 2009/0101720 A1 | 4/2009 | Dewan et al. | |

FOREIGN PATENT DOCUMENTS

| | | |
|---|---|---|
| EP | 0133317 | 2/1985 |
| EP | 0498369 | 8/1992 |
| EP | 0156440 | 12/1992 |
| EP | 0915573 | 5/1999 |
| EP | 0923061 | 6/1999 |
| EP | 1095427 | 5/2001 |
| EP | 1436857 | 7/2004 |
| FR | 2648602 | 12/1990 |
| GB | 1270456 | 4/1972 |
| JP | 1158836 | 6/1989 |
| JP | 2002-185381 | 6/2002 |
| JP | 2005-227818 | 8/2005 |
| JP | 2005-253058 | 9/2005 |
| JP | 2006-252367 | 9/2006 |
| KR | 2002-0091572 | 12/2002 |
| WO | WO 90/16119 | 12/1990 |
| WO | WO 99/05659 | 2/1999 |
| WO | WO 01/24407 | 4/2001 |
| WO | WO 03/044892 | 5/2003 |
| WO | WO 04/001445 | 12/2003 |
| WO | WO 2005/072137 | 8/2005 |
| WO | WO 2006/037241 | 4/2006 |
| WO | WO 2006/068635 | 6/2006 |
| WO | WO 2007/003300 | 1/2007 |
| WO | WO 2007/094787 | 8/2007 |
| WO | WO 2007/126240 | 11/2007 |
| WO | WO 2009/058809 | 5/2009 |

OTHER PUBLICATIONS

Strang, Gilbert "*Linear Algebra and Its Applications*", Harcourt Brace Jovanovich, Inc., 1988.

International Preliminary Report on Patentability (IPRP) issued in international application No. PCT/US2010/020475 on Mar. 21, 2011, 9 pages.

Bridgelall, Raj; "Bluetooth/802.11 Protocol Adaptation for RFID Tags"; Symbol Technologies, Research & Development, One Symbol Plaza, Holtsville, New York 11742; 4 pages. Retrieved from <http://www2.ing.unipi.it/ew2002/proceedings/001.pdf>.

Burgener, E.C.; "A Personal Transit Arrival Time Receiver;" IEEE—IEE Vehicle Navigation & Information Systems Conference; Ottawa, Ontario, Canada; 1993; pp. 54-55. Retrieved from <http://ieeexplore.ieee.org/xpl/freeabs_all.jsp?arnumber=585583>.

Cavoukian, Ann; "Adding an On/Off Device to Activate the RFID in Enhanced Driver's Licenses: Pioneering a Made-in-Ontario Transformative Technology that Delivers Both Privacy and Security"; Information and Privacy Commissioner of Ontario; Ontario, Canada; Mar. 2009; 3 pages. Retrieved from <http://www.ipc.on.ca/images/Resources/edl.pdf>.

Desmons, Dimitri; "UHF Gen 2 for Item-Level Tagging"; Impinj, Inc.; 24 pages. Retrieved from <http://www.impinj.com/files/Impinj_ILT_RFID_World.pdf>.

Donovan, John; "Software-Defined Radio Tackles Wireless Compatibility Issues"; Portable Design; Apr. 2006; pp. 8-12. Retrieved from <http://www.qmags.com/download/default.aspx?pub=PD&upid=11675&fl=others/PD/PD_20060401_Apr_2006.pdf>.

Han Y. et al.; "System Modeling and Simulation of RFID"; Auto-ID Labs at Fudan University, Shanghai, P.R. China; 12 pages. Retrieved from <http://citeseerx.ist.psu.edu/viewdoc/download?doi=10.1.1.116.7275&rep=rep1&type=pdf>.

Hansen, T. et al.; "Method for Controlling the Angular Extent of Interrogation Zones in RFID"; Seknion, Inc., 2000 Commonwealth Avenue, Suite 1008, Boston, MA 02135; 12 pages. Retrieved from <http://seknion.com/DOWNLOADS/Seknion_Paper_RFID.pdf>.

Hiltunen, Kimmo; "Using RF Repeaters to Improve WCDMA HSDPA Coverage and Capacity inside Buildings"; The 17th Annual IEEE International Symposium on Personal, Indoor, and Mobile Radio Communications (PIMRC-06); 2006; 5 pages. Retrieved from <http://www.ericsson.com/technology/research_papers/wireless_access/doc/PIMRC06_hiltunen.pdf>.

Khandelwal, G. et al. "Intelligent MAC Design for RFID Networks"; The Pennsylvania State University; 1 page.

Khandelwal, G. et al.; "OPT: Optimal Protocol Tree for Efficient Tag Identification in Dense RFID Systems"; IEEE International Conference on Communications; Jun. 11-15, 2006; pp. 128-133.

Kusy et al.; "Tracking Mobile Nodes Using RF Doppler Shifts"; Vanderbilt University, Nashville, Tennessee; 14 pages. Retrieved from <http://www.isis.vanderbilt.edu/sites/default/files/Kusy_B_11_7_2007_Tracking_M.pdf>.

"New Alien Software Can Identify Velocity, Position of Tags"; RFID News; Apr. 14, 2008; 2 pages. Retrieved from <http://www.rfidnews.org/2008/04/14/new-alien-software-can-identify-velocity-position-of-tags>.

O'Connor, Mary Catherine; "Wal-Mart Seeks UHF for Item-Level"; RFID Journal, Inc.; 2005; 2 pages. Retrieved from <http://www.rfidjournal.com/article/articleview/2228/1/1/>.

Rohatgi, A. et al.; "Implementation of an Anti-Collision Differential-Offset Spread Spectrum FRID System"; Georgia Institute of Technology. School of Electrical and Computer Engineering; IEEE Antennas Propagation Society International Symposium 2006; 4 pages. Retrieved from <http://www.propagation.gatech.edu/Archive/PG_CP_060710_AR/PG_CP_060710_AR.PDF>.

Waldrop et al.; "Colorwave: A MAC for RFID Reader Networks"; Auto-ID Center, Massachusetts Institute of Technology, Cambridge, MA; 4 pages.

Yu, P. et al.; "Securing RFID with Ultra-Wideband Modulation"; Virginia Tech Electrical and Computer Engineering Department; Blacksburg, VA; Workshop on RFID Security; Jul. 2006; 12 pages. Retrieved from <http://events.iaik.tugraz.at/RFIDSec06/Program/papers/004%20-%20Ultra%20Wideband%20Modulation.pdf>.

"Near Field UHF Versus HF"; IDTechEx; May 16, 2006; 1 page. Retrieved from <http://www.idtechex.com/research/articles/near_field_uhf_versus_hf_00000474.asp>.

Kiming, Q. et al.; "Development of a 3cm Band Reflected Power Canceller"; Research Institute of Navigation Technology; 2001 CIE International Conference on, Proceedings; 2001; pp. 1098-1102.

"Developments in Printed Conductors and Tags"; IDTechEx; Jun. 6, 2005; 1 page. Retrieved from <http://www.idtechex.com/research/articles/developments_in_printed_conductors_and_tags_00000188.asp>.

Ryu, H-K. et al.; "Size Reduction in UHF Band RFID Tag Antenna Based on Circular Loop Antenna"; 18th International Conference on Applied Electromagnetics and Communications, ICECom; Oct. 12-14, 2005; pp. 1-4.

Binu P, et al.; "A New Microstrip Patch Antenna for Mobile Communications and Bluetooth Applications"; Microwave and Optical Technology Letters; vol. 33, No. 4, May 20, 2002; pp. 285-286.

Garg et al.; "Microstrip Radiators"; Microstrip Antenna Design Handbook; Artech House, Inc. Norwood, MA; 2001; pp. 1-72.

"Radio Frequency Identification (RFID) Primer" 23 pages. Retrieved from < http://ocw.mit.edu/NR/rdonlyres/Sloan-School-of-Management/15-762JSpring-2005/23F46055-7F21-4046-B2C3-7E96680790DD/0/rfid_primer.pdf>.

* cited by examiner

FIG. 10

DETERMINING SPEEDS OF RADIO FREQUENCY TAGS

TECHNICAL FIELD

This invention relates to radio frequency signals and, more particularly, to determining speeds of radio frequency tags.

BACKGROUND

In some cases, an RFID reader operates in a dense reader environment, i.e., an area with many readers sharing fewer channels than the number of readers. Each RFID reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. When a low-power signal of narrow frequency bandwidth is received by an RFID reader, the signal to noise ratio of the received signal may be very small.

SUMMARY

The present disclosure is directed to determining speeds of radio frequency tags. In some implementations, a method includes sampling a Radio Frequency (RF) signal from an RFID tag at a plurality of different times as the RFID tag approaches an RFID reader and recedes from the RFID reader. A phase of the RF signal is determined for each of the plurality of different times based, at least in part, on the sampled RF signal. A speed of the RFID tag is determined based, at least in part, on the determined phase for the sampled signal for each of the plurality of different times.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
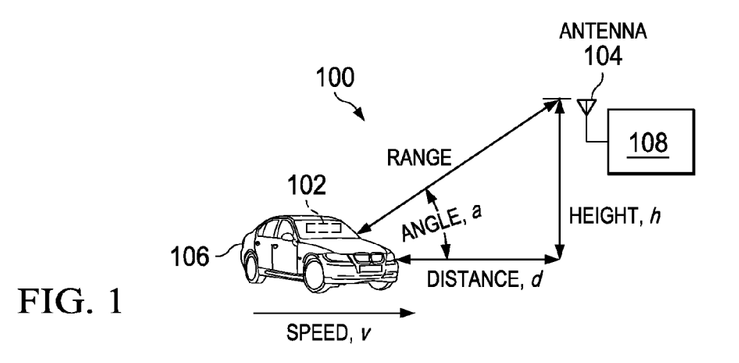
FIG. 1 is a block diagram illustrating an example tracking system for determining speeds of vehicles.

FIG. 1 is a block diagram illustrating an example system 100 for determining speeds of one or more Radio Frequency IDentification (RFID) tags in accordance with some implementations of the present disclosure. For example, the system 100 may determine a speed of a vehicle including an RFID tag based, at least in part, on the Doppler shift in RF signals from the moving RFID tag. In regards to Doppler shifts, the system 100 may detect a Doppler shift in the RF signals by detecting changes in the phase of the RF signals. In other words, the system 100 may detect a decreasing phase for the RF signals as the RFID tag approaches an RFID reader and an increasing phase as the RFID tag recedes from the RFID reader. Using the detected or otherwise determined phases, the system 100 may determine the slope of the phase curve as a function of time and, in turn, the velocity of the RFID tag based, at least in part, on the slope of the phase curve. In some implementations, the system 100 may execute one or more of the following: detect RF signals from a moving RFID tag at a plurality of different times; determine a phase of the RF signal for each of the plurality of different times; estimate a curve for the phase as a function of time based, at least in part, on the determined phases and times; determine a slope of the curve for one or more specified times; and/or determine a velocity of the RFID tag based, at least in part, on the slope of the phase curve.

At a high level, the system 100 includes a passive or semi-passive tag 102 communicably coupled with an RF reader 108 through the antenna 104. The RF reader 108 transmits a request for information to the tag 102 through one or more antennas. In response to at least the request, the tag 102 transmits a backscattered signal identifying information associated with the tag 102 and/or vehicle 106. In response to at least receiving the backscattered signal, the reader 108 may determine a phase associated with the received signal. The reader 108 may sample additional backscattered signals as the RFID tag 102 approaches the reader 108, passes tangentially, and recedes from the reader 108. In connection with sampling the RF signal at different times, the reader 108 may determine phases for a plurality of different times. Based, at least in part, on the determined phases and associated times, the reader may determine or otherwise estimate a speed of the vehicle 106 including the RFID tag 102.

Turning to a more detailed description of some implementations of the system 100, the RFID tags 102 can include any software, hardware, and/or firmware configured to respond to communication from the RFID reader 108. These tags 102 may operate without the use of an internal power supply. Rather, the tags 102 may transmit a reply using power stored from the previously received RF signals, independent of an internal power source. This mode of operation is typically referred to as backscattering. In some implementations, the tags 102 alternate between absorbing power from signals transmitted by the RFID reader 108 and transmitting responses to the signals using at least a portion of the absorbed power. In passive tag operation, the tags 102 typically have a maximum allowable time to maintain at least a minimum DC voltage level. In some implementations, this time duration is determined by the amount of power available from an antenna of a tag 102 minus the power consumed by the tag 102 and the size of the on-chip capacitance. The effective capacitance can, in some implementations, be configured to store sufficient power to support the internal DC voltage when there is no received RF power available via the antenna. The tag 102 may consume the stored power when information is either transmitted to the tag 102 or the tag 102 responds to the RFID reader 108 (e.g., modulated signal on the antenna input). In transmitting responses back to the RFID reader 108, the tags 102 may include one or more of the following: an identification string, locally stored data, tag status, internal temperature, and/or others. For example, the tag 102 may transmit information including or otherwise identifying vehicle information such as type, weight, vehicle height, tag height, account number, owner information (e.g., name, license number), and/or other information. In some implementations, the signals can be based, at least in part, on sinusoids having frequencies in the range of 902-928 MHz or 2400-2483.5 MHz.

The RFID reader 108 can include any software, hardware, and/or firmware configured to transmit and receive RF signals. In some implementations, the RFID reader 108 can determine or at least estimate a speed of the vehicle 106 including the RFID tag 102. The RFID reader 108 may transmit requests for information within an interrogation zone associated with the reader 108. The reader 108 may transmit the query in response to a request, automatically, in response to a threshold being satisfied (e.g., expiration of time), as well as others events. The interrogation zone may be based on one or more parameters such as transmission power, associated protocol, nearby impediments (e.g., objects, walls, buildings), as well as others. In some implementations, the RFID reader 108 may transmit multiple requests for information to the RFID tag 102 to determine the Doppler shift of the received responses. For example, the RFID reader 108 may detect or otherwise determine the phase associated with each response of the RFID tag 102. In some instances, the RF reader 108 may sample the RF signal from the RFID tag 102 as the tag 102 approaches the reader 108 and as the tag 102 recedes from the reader 108. In doing so, the RF reader 108 may detect an increasing phase as the tag 102 approaches and a decreasing phase as the tag 102 recedes in accordance with the Doppler shift.

In some implementations, the Doppler shift in the signal from the RFID tag 102 may be determined based, at least in part, on the component of the speed of the vehicle 106 transverse to the RFID reader 108. In these instances, the traverse speed $v_t$ can be determined using the speed of the vehicle 106 v times the cosine of the angle as indicated below:

$$v_t = v \cdot \cos(a).$$

The equation above is commonly referred to as the "cosine effect" in radar based speed estimation. The angle may be determined from taking the inverse cotangent of the distance d between the vehicle and the point below the RFID reader 108 over the height h from the surface to the RFID reader 108 as indicated below:

$$a = \cot^{-1}(d/h).$$

In some implementations, the Doppler shift $f_d$ may be determined as a function of time, vehicle velocity, antenna height, and carrier frequency using the following expression:

$$f_d(t) = F_c \cdot \left(1 - \frac{c}{c + 2 \cdot v \cdot \cos(\cot^{-1}(v \cdot t/h))}\right).$$

In the above identified expression, the time that the vehicle 106 is below the RFID reader 108 may be assumed to be t=0 without loss of generality. Though, without knowing the distance to the tag 102, the RFID reader 108 may not be able to determine a one-to-one function between the detected Doppler shift and the vehicle speed because of the cosine effect. In some implementations, the slope of the blue-to-red shift or the curve of $f_d(t)$ can be used to determine the speed of the vehicle 106 including the RFID tag 102. In these instances, the speed may be determined independent of a range estimation to the vehicle 106. In addition, the phase measurements may be made where the tag 102 has high Signal-to-Noise Ratio (SNR) such as 30 dB or more. The slope of the Doppler shift as the vehicle 106 moves past the antenna 104 may be expressed as the following:

$$\frac{df_d(t)}{dt} = F_c \cdot \frac{2 \cdot c \cdot v^2 \cdot \sin(\cot^{-1}(v \cdot t/h))}{h \cdot (c + 2 \cdot v \cdot \cos(\cot^{-1}(v \cdot t/h)))^2 \cdot (1 + (v \cdot t/h)^2)}$$

Again assuming the vehicle passes directly beneath the antenna 104 at t=0, $$\frac{df_d(0)}{dt} = F_c \cdot \frac{2 \cdot v^2}{h \cdot c}$$

Solving for the velocity:

$$v = \sqrt{\frac{h \cdot c}{2 \cdot F_c} \frac{df_d(0)}{dt}}$$

In some implementations, the Doppler slope may be determined or estimated using the following expression:

$$\frac{df_d(t)}{dt} = \frac{d^2 \hat{\theta}(t)}{dt^2}.$$

In some instances, differentiating the phase may increase noise in the solutions. While time averaging the second derivative may decrease the noise while increasing estimator bias, another approach to solving, determining, or at least estimating the slope of the Doppler shift may be to use curve fitting, which may avoid the derivatives and effectively averages across multiple samples without substantially biasing the estimator. Specifically, assume the tag 102 passes directly beneath the antenna at time $t=t_0$. If the Doppler slope is approximated as linear in the region around $t=t_0$, then the phase may be approximately quadratic in this region, $$\hat{\theta}(t) = \frac{f'_d}{2} \cdot t^2 + f_d \cdot t + \phi$$

where $\theta_0$ is an arbitrary phase offset determined by the total round trip delay of the RF signal and $$\left.\frac{d^2 \hat{\theta}(t)}{dt^2}\right|_{t=t_0} = f'_d$$

The phase curve in the vicinity of $t=t_0$ may be written in expanded form as:

$$\hat{\theta}(t) = \frac{f'_d}{2} \cdot t^2 - f'_d t_0 \cdot t + \left(\frac{f'_d}{2} t_0^2 - \theta_0\right)$$

In some implementations, the RFID reader 108 may sample the signal from the RFID tag 102 for a plurality of different times. For example, the reader 108 may periodically transmit request for information to the tag 102 as the tag 102 approaches the reader antenna 104 and recedes from the antenna 104. The multiple phase measurements and associated times may be denoted as follows:

$$\{t_n, \theta_n\} \text{ for } 0 \leq n < N.$$

where N is the number of phase measurements. As indicated above, the phase measurements may be approximated with quadratics and written in a matrix form as illustrated by following phase expression:

$$\begin{bmatrix} t_0^2 & t_0 & 1 \\ t_1^2 & t_1 & 1 \\ \vdots & \vdots & \vdots \\ t_{N-1}^2 & t_{N-1} & 1 \end{bmatrix} \cdot \begin{bmatrix} \alpha \\ \beta \\ \delta \end{bmatrix} = \begin{bmatrix} \theta_0 \\ \theta_1 \\ \vdots \\ \theta_{N-1} \end{bmatrix}$$

Where $$\alpha = \frac{f'_d}{2}, \beta = f'_d t_0, \text{ and } \delta = \frac{f'_d}{2} t_0^2 - \theta_0.$$

The above three matrices may be denoted as follows:

$$A = \begin{bmatrix} t_0^2 & t_0 & 1 \\ t_1^2 & t_1 & 1 \\ \vdots & \vdots & \vdots \\ t_{N-1}^2 & t_{N-1} & 1 \end{bmatrix}$$

$$x = \begin{bmatrix} \alpha \\ \beta \\ \delta \end{bmatrix}$$

$$b = \begin{bmatrix} \theta_0 \\ \theta_1 \\ \vdots \\ \theta_{N-1} \end{bmatrix}$$

As a result of this denotation, the phase expression may be rewritten as followed:

$$A \cdot x = b$$

In the event that the reader 108 has sampled the tag signal more than three times, i.e., N>3, the phase expression is an over determined set of equations. In some implementations, the phase expression may be determined using a least squares process and may be solved as indicated below:

$$\bar{x} = (A^T A)^{-1} \cdot A^T \cdot b$$

Based on the least-squares solution, the Doppler slop may be estimated using the following expression:

$$f'_d \approx 2 \bar{x}(0) = 2\alpha$$

Regardless of the method for determining or at least estimating the Doppler slope, the speed of the vehicle may be at least estimated using the Doppler slope and the velocity expression discussed above.

In some implementations, the RFID reader 108 may include a controller, a transceiver coupled to the controller, and RF antennas coupled to the transceiver. For example, the RF antennas may transmit commands generated by the controller and receive responses from the RFID tag 102. In certain cases such as tag-talks-first (TTF) systems, the reader 108 may not transmit commands but only RF energy. In some implementations, the controller can determine statistical data and/or position data based, at least in part, on tag responses. The reader 108 often includes a power supply or may obtain power from a coupled source for powering included elements and transmitting signals. In some implementations, the reader 108 operates in one or more of frequency bands allotted for RF communication. For example, the Federal Communication Commission (FCC) have assigned 902-928 MHz and 2400-2483.5 MHz as frequency bands for certain RFID applications. In some implementations, the reader 108 may dynamically switch between different frequency bands. The reader 108 can, in some implementations, include three or more antennas 104 in any geometric configuration that allows triangulation based, at least in part, on TDOA. In some implementations, the antennas 104 may be selectively positioned to optimize, enhance, or otherwise increase precision and/or accuracy of position tracking. In pulse compressing backscattered signals, the reader 108 may receive that backscattered signal, a wide bandwidth signal, and compress the pulse using a long time duration match filter, a correlation receiver and/or other module to achieve substantial processing gain. For example, the reader 108 may achieve a factor of 60 dB processing gain, which may translate to lower radiated power requirements from the transponder. In some implementations, the reader 108 can determine the pulse-compressed signal based, at least in part, on the backscattered spread-spectrum signal from the tag 102. For example, the reader 108 may store or otherwise identify the pseudorandom sequence used by the tag 102 to determine the pulse-compressed signal.

Figure 2:
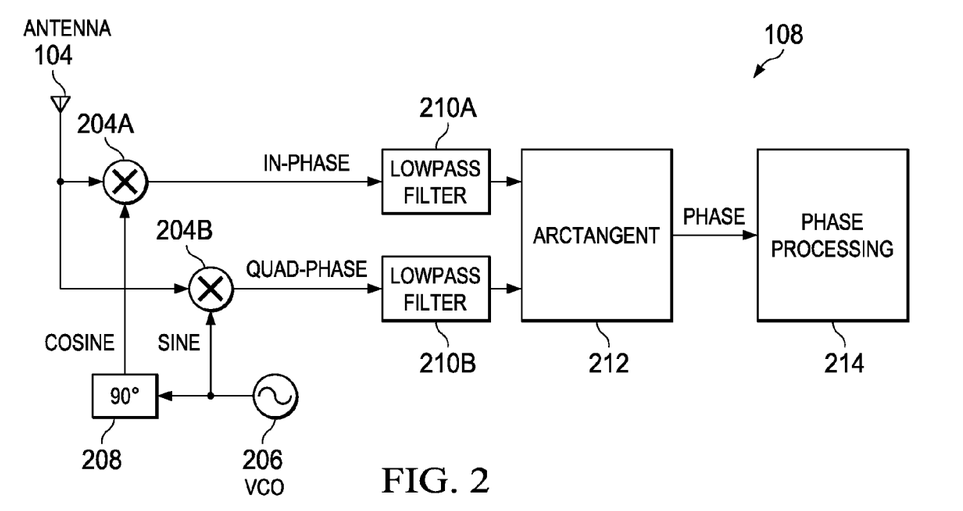
FIG. 2 illustrates an example RFID reader in accordance with some implementations of the present disclosure.

FIG. 2 illustrates an example RFID reader 108 of FIG. 1 in accordance with some implementations of the present disclosure. In some implementations, the illustrated reader 108 can determine or at least estimate a speed of a vehicle based, at least in part, on signal samples from a moving RFID tag 102. For example, the reader 108 may determine a phase associated with a moving RFID tag 102 for a plurality of different times and estimate the speed of the tag based, at least in part, on the determined phases and times. In some implementations, the reader 108 may estimate the phase of a signal based, at least in part, on the in-phase and quadrature baseband signals.

In the illustrated implementation, the RFID reader 108 includes an antenna 104, mixers 204a and 204b, a Voltage Controlled Oscillator (VCO) 206, a phase shift 208, Low Pass Filters (LPFs) 210a and 210b, an arctangent module 212, and a phase processing module 214. While not illustrated, the reader 108 can include other elements such as those associated with processing digital signals, transmitting signals, noise cancellation, and/or others. The antenna 104 is configured to receive, from transponders, RF signals. The reader 108 may be a "mono-static" design, i.e., readers in which the transmitter and receiver share the same antenna or "bi-static" design, i.e., readers which use separate antennas for transmit and receive. The antenna 104 directs a first portion of the received signal to the mixer 204a and second portion of the received signal to the mixer 204b. The VCO 206 includes any hardware, software, and/or firmware operable to generate a signal at a frequency based, at least in part, on an input voltage. In some implementations, the output signal of the VCO 206 can be represented as:

$$x(t) = A \cos(2\pi f t + \phi(t)),$$

where A is the amplitude, f is the frequency, and $\phi(t)$ is the oscillator phase noise process. The phase noise $\phi(t)$ present in the transmitter leakage signal can produce spectral "skirts" in the signal in the receive path. The VCO 206 directs a first portion of the VCO signal to the phase shift 208 and a second portion to the mixer 204b. The phase shift 208 shifts the phase of the first portion of the VCO signal 90° and passes the phase-shifted first portion to the mixer 204a.

The mixer 204a downconverts the first portion of the received signal to an in-phase baseband signal. In other words, the mixer 204a generates the in-phase baseband signal by multiplying the first portion of the received signal by the phase-shifted first portion of the VCO signal. The mixer 204a passes the in-phase signal to the lowpass filter 210a. The mixer 204b downconverts the second portion of the received signal to a quadrature baseband signal. In other words, the mixer 204b generates the quadrature baseband signal by multiplying the second portion of the received signal by the VCO signal. The mixer 204b passes the quadrature baseband signal to the low pass filter 210b. The LPF 210a receives the in-phase baseband signal from the mixer 204a and attenuates frequencies higher than a cutoff frequency from the in-phase baseband signal. The LPF 210a passes the filtered in-phase baseband signal to the arctangent module 212 for determining or at least estimating the phase of the RF signal received by the antenna 104. The LPF 210b receives the quadrature baseband signal from the mixer 204b and attenuates frequencies higher than a cutoff frequency from the quadrature baseband signal. The LPF 210b passes the filtered quadrature baseband signal to the arctangent module 212 for determining or at least estimating the phase of the RF signal received by the antenna 104. The arctangent module 212 determines the phase of the received RF signal by computing the four-quadrant arctangent using the amplitude of the baseband quadrature and the in-phase signals. The in-phase and quadrature-phase amplitudes may form a Cartesian representation of the RF carrier phase and amplitude backscattered from the RFID tag 102. The four quadrant arctangent may convert the in-phase and quadrature-phase Cartesian representation to a backscattered carrier phase. The arctangent module 212 passes the determined phase to the phase processing module 214 for determining the speed of the vehicle associated with the transmitting RFID tag. As previously mentioned, the phase processing module 214 may determine the speed of a vehicle based, at least in part, on phase determinations for a plurality of different times as the vehicle moves relative to the antenna 104. For example, the antenna 104 may transmit a plurality of requests to a vehicle including an RFID tag at different times.

In some implementations, the reader 108 may periodically transmit request for information to one or more RFID tags (e.g., an ISO 18000-6C "query" command) in an associated interrogation zone. In response to at least an event, the phase processing module 214 may estimate a curve that fits the phases and times associated with an RFID tag. For example, the phase processing module 214 may curve fit a polynomial equation (e.g., quadratic equation) to the determined phases as a function of time. Though, other types of equations may be used to curve fit the determined phases such a trigonometric, exponential, and/or others. The event may include determining a specified number of phases associated with an RFID tag, determining the phase differences have switched between positive and negative, and/or other events. In connection with curve fitting the phases, the phase processing module 214 may determine a slope of the Doppler shift as, for example, the Doppler shift switches from a positive frequency to a negative frequency. In other words, the phase processing module 214 may determine the slope as the vehicle passes below the antenna 104. In some implementations, the phase processing module 214 can determine the speed of a vehicle using the slope of the Doppler shift and the velocity expression discussed in reference to FIG. 1.

Figure 3:
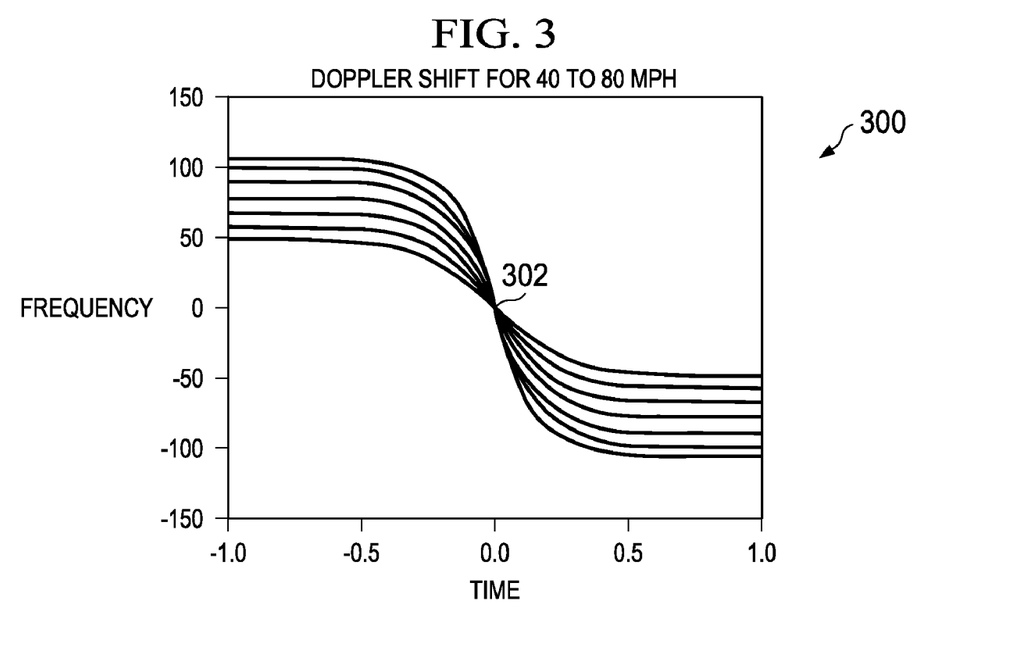
FIGS. 3 to 8 are example graphs associated with determining a speed of a vehicle.

FIG. 3 is an example graph 300 illustrating a Doppler shift associated with various speeds. In particular, the graph 300 illustrates the Doppler shift for vehicles with speeds from 40 Miles Per Hour (MPH) to 80 MPH. As illustrated, the Doppler shift varies over times as the vehicle range decreases and then increases between the tag 102 and the antenna 104 as the vehicle passes below the antenna 104. In addition, the point 302 illustrates time equal to zero or the time that the vehicle travels below the antenna 104. At the point 302, the vehicle does not have a speed component transverse to the reader and, as a result, the Doppler shift is zero. In other words, as the RFID tag crosses under and past the antenna of the antenna 104, the Doppler shift changes from a blue shift to a red shift.

Figure 4:
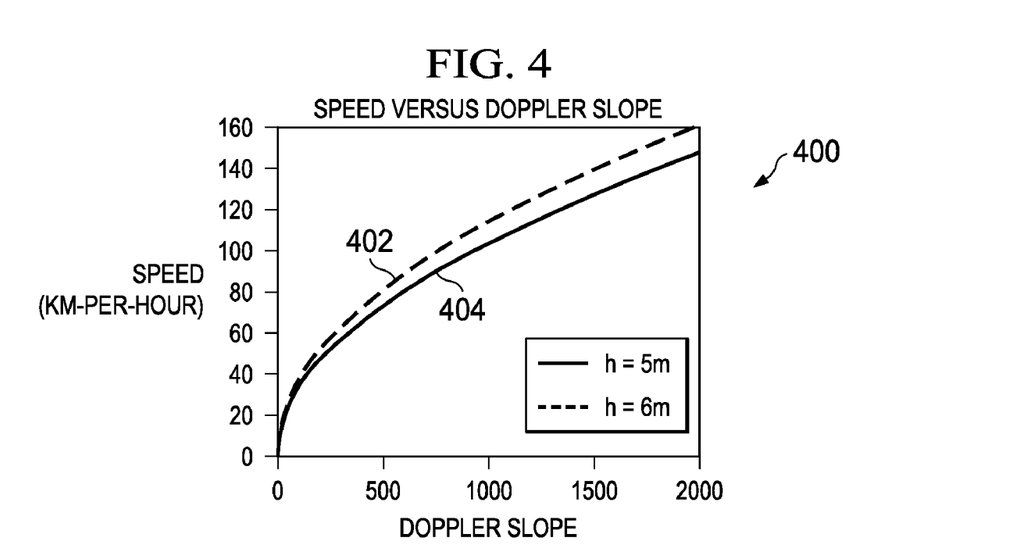

FIG. 4 is an example graph 400 illustrating the determined speed of a vehicle as a function of the Doppler slope. In particular, the graph 400 includes a curve 402 associated with an RFID tag equal to height 5 meters (m) and a curve associated with an RFID tag height equal to 6 m. The curves 402 and 404 are based, at least in part, on the velocity expression discussed with respect to FIG. 1 for two different heights. As illustrated the graph 400, the curves 402 and 404 are a function of the tag height. For example, the difference in the speed determination may be significant (e.g., greater than 5%) based on the height difference between a truck and a car. In some implementations, the signals from the RFID tags may include height codes that includes or at least identifies a height estimates for the RFID tags that may be used in the slope-to-velocity formula. The sensitivity to height may be expressed as followed:

$$\frac{dv}{dh} = \frac{1}{2}\sqrt{\frac{c}{2 \cdot h \cdot F_c} \frac{df_d(0)}{dt}}$$

In other words, the height issue may be inherent in the problem of determining a speed of a vehicle.

Figure 5:
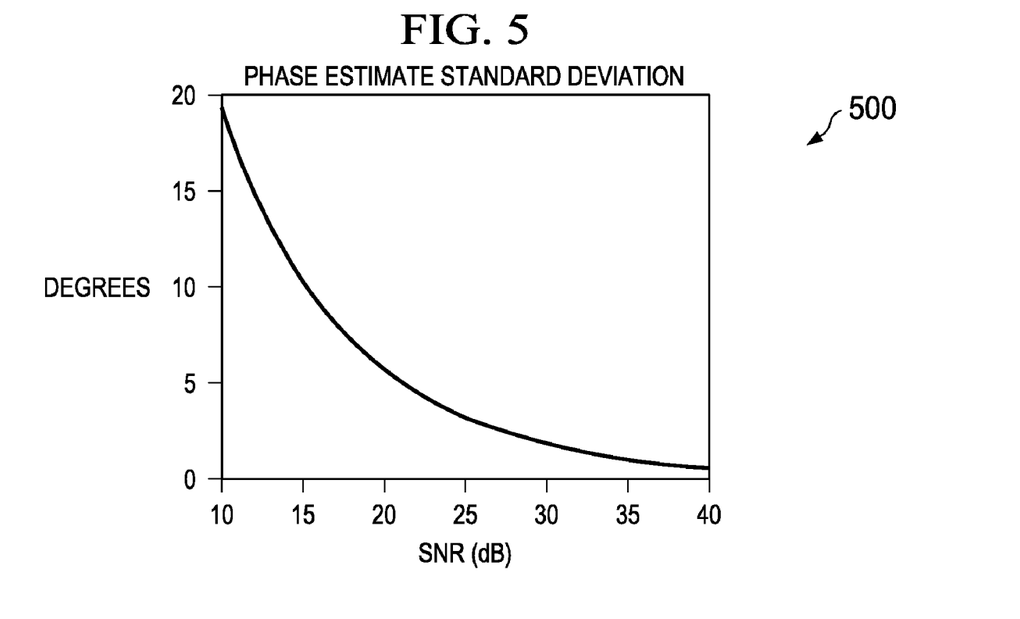

FIG. 5 is an example graph 500 illustrating phase estimates as a function of the Signal-to-Noise Ratio (SNR) in accordance with some implementations of the present disclosure. In some implementations, the phase estimation can done by filtering the baseband I and Q signals with a narrowband filter centered at the tag backscatter subcarrier frequency. In these instances, the filter outputs $I_{out}$ and $Q_{out}$ may be used to determine a phase estimation using the values as inputs to a four-quadrant arctangent function as illustrated below:

$$\hat{\theta} = \tan^{-1}(Q_{out}, I_{out}).$$

The graph 500 shows the standard deviation of the phase estimate θ as a function of the signal to noise ratio of $I_{out}$ and $Q_{out}$.

Figure 6:
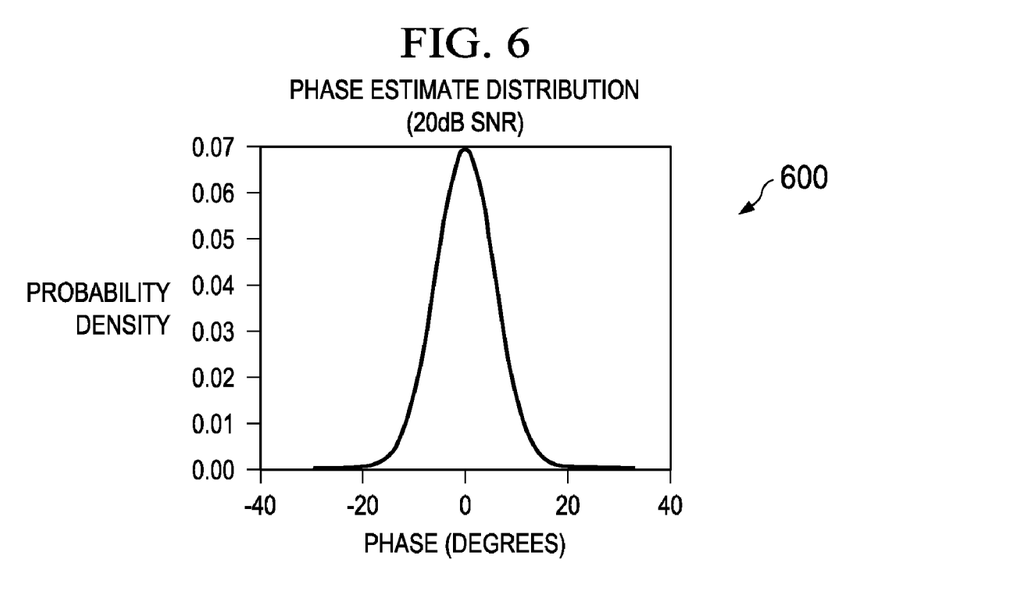

FIG. 6 is an example graph 600 illustrating a phase estimate distribution in accordance with some implementations of the present disclosure. In some implementations, the phase estimate can be a random variable. For example, from the graph 600 with $I_{out}$ and $Q_{out}$ having signal-to-noise ratios of 20 dB, the standard deviation of the phase estimate may be:

$$\sigma_\theta \approx 5.76 \text{ degrees}.$$

In some implementations, the phase estimate can be normally distributed. In these instances, there is a 95% chance that the estimate is within 16 degrees of the true value.

Figure 7:
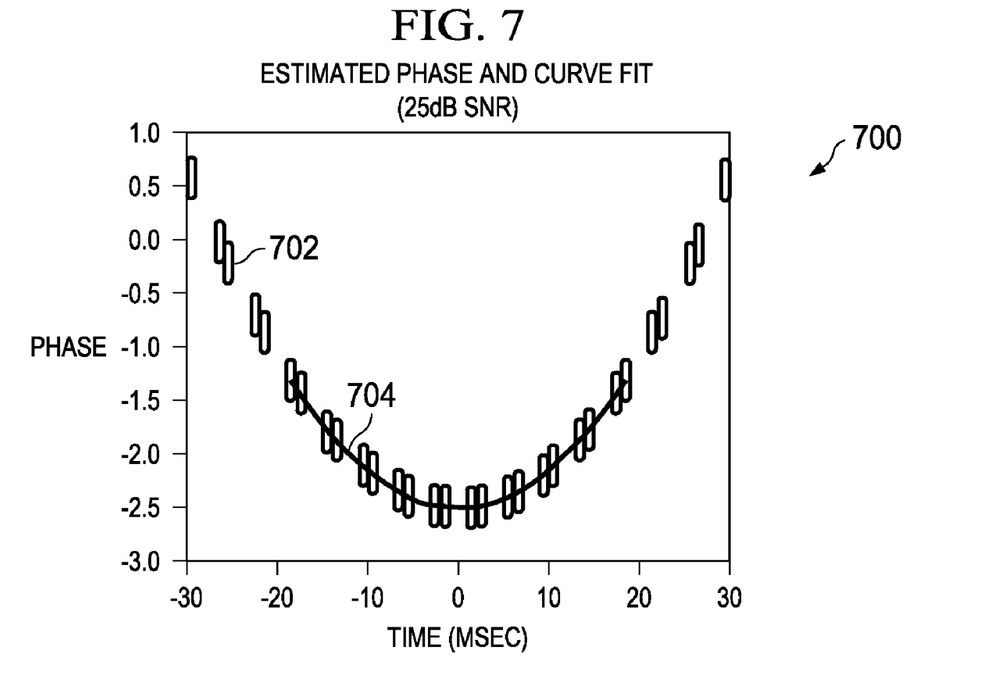
Figure 8:
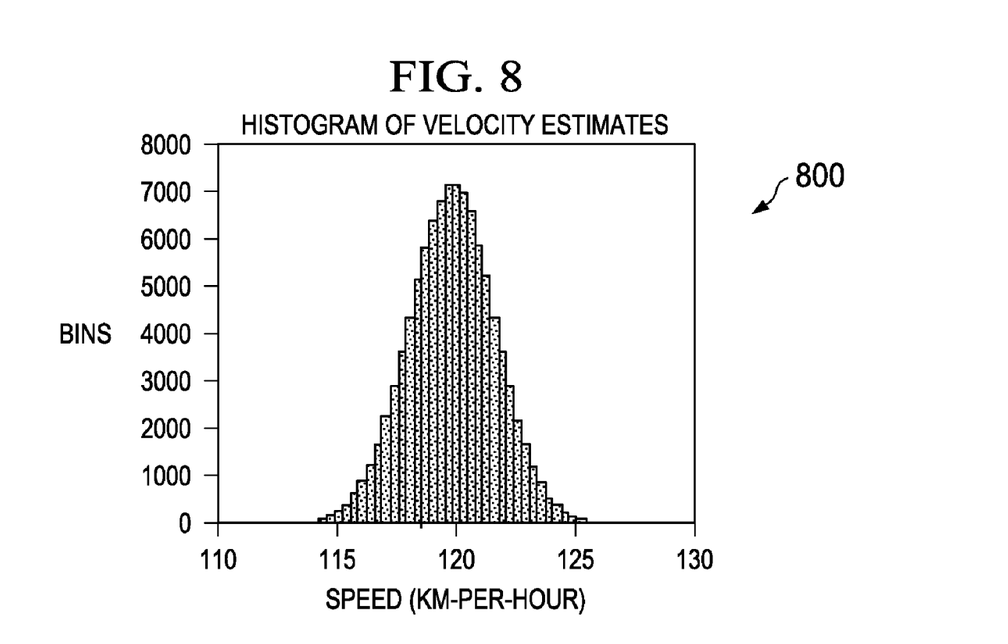

FIGS. 7 and 8 are example graphs 700 and 800, respectively, illustrate phase estimates and speed estimates in accordance with some implementations of the present disclosure. The graph 700 includes a plot 702 illustrating the phase estimates and a curve 704 that illustrates a curve fit of the plotted data points. In some implementations, the curve 704 can be a polynomial equation. The graph 800 illustrates a histogram of the velocity estimates. For the model speed 120 km/hour and 25 dB SNR, the velocity estimator may have a standard deviation of 1.82 km/hour. Therefore, there is 95% confidence that the actual speed is within 5 km/hour of the estimate. At 30 dB SNR, the standard deviation may be 1.03 km/hour, and at 35 dB the standard deviation may be 0.58 km/hour.

Figure 9:
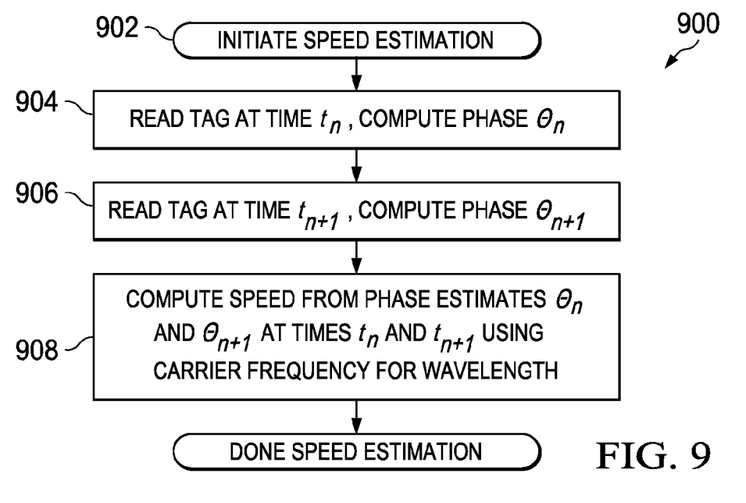
FIGS. 9 and 10 are flowcharts illustrating example methods for estimating speeds of vehicles.
Figure 10:
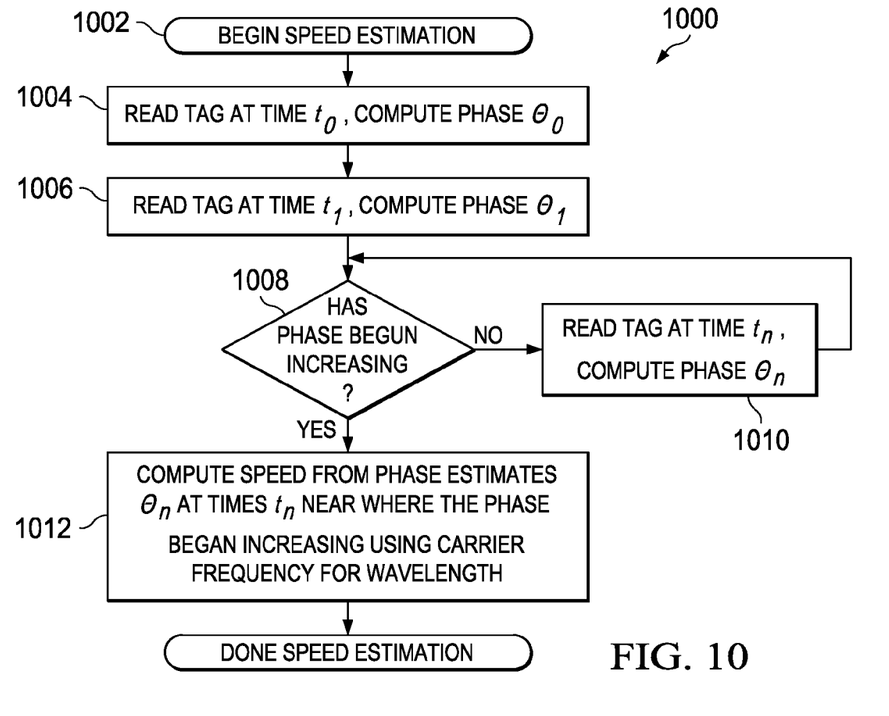

FIGS. 9 and 10 are flowcharts illustrating example methods 900 and 1000 for determining speeds of vehicles based on Doppler shifts. Generally, the methods 900 and 1000 describe example techniques for determining vehicle speeds using the slopes of the Doppler shifts. In particular, the methods 900 and 1000 describe sampling phases of signals received from a moving RFID tag, determining a slope of the Doppler shift using the phase measurements, and determining the vehicle speed using the slope. The reader 108 may use any appropriate combination and arrangement of logical elements implementing some or all of the described functionality.

Referring to FIG. 9, the method 900 begins at step 902 where the speed estimation process is initiated. At step 904, a phase $\theta_n$ is computed at a time $t_n$. For example, the reader 108 of FIG. 1 may sample signals from the RFID tag 102 at a plurality of different times. In this example, the reader 108 may estimate a phase of the received signal at an associated time. Next, at step 906, a phase $\theta_{n+1}$ is computed at a time $t_{n+1}$. In the example, the reader 108 may determine the phase of the received signal at the next time interval. The speed is computed based, at least in part, on the phase estimates $\theta_n$ and $\theta_{n+1}$ at times $t_n$ and $t_{n+1}$ using the carrier frequency for the wavelength.

Referring to FIG. 10, the method 1000 begins at step 1002 where the speed estimation process is initiated. At step 1004, a phase $\theta_0$ is computed at a time $t_0$. For example, the reader 108 of FIG. 1 may sample signals from the RFID tag 102 at an initial time and estimate the associated phase. Next, at step 1006, a phase $\theta_1$ is computed at a time $t_1$. In the example, the reader 108 may determine the phase of the received signal at the next time interval. In the event that the phase has not begun to increase at decisional step 1008, then, at step 1010, a phase $\theta_n$ is computed at a time $t_n$ and execution returns to decisional step 1008. The speed is computed based, at least in part, on the phase estimates $\theta_n$ at times $t_n$ near where the phase began increasing using carrier frequency for the wavelength.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
   sampling a Radio Frequency (RF) signal from an RFID tag at a plurality of different times as the RFID tag approaches an RFID reader and recedes from the RFID reader;
   determining a phase of the RF signal for each of the plurality of different times based, at least in part, on the sampled RF signal;
   determining a slope of a Doppler curve based, at least in part, on the determined phase for the sampled RF signal for each of the plurality of different times; and
   determining a speed of the RFID tag based, at least in part, on the slope of the Doppler curve.

2. The method of claim 1, wherein the speed of the RFID tag is determined based, at least in part, on a height of the RFID tag.

3. The method of claim 2, further comprising identifying the height of the RFID tag based, at least in part, on the sampled signal.

4. The method of claim 1, wherein determining the phase of the RF signal comprises estimating the phase of the RF signal for each of the plurality of different times based, at least in part, on the sampled RF signal.

5. The method of claim 4, wherein the phase of the RF signal is estimated based, at least in part, on a polynomial equation.

6. The method of claim 1, wherein determining the slope of the Doppler curve comprises:
   estimating the curve of the phase of the RF signal as a function of the plurality of different times; and
   determining the slope of the curve at a specific time.

7. The method of claim 6, wherein the specific time is a time that the RFID tag is moving approximately tangential to the RFID reader.

8. The method of claim 6, wherein the estimated curve is determined based, at least in part, on a least-squares method.

9. A RFID reader, comprising:
   an antenna that samples a RF signal from an RFID tag at a plurality of different times as the RFID tag approaches an RFID reader and recedes from the RFID reader;
   an arctangent module that determines a phase of the RF signal for each of the plurality of different times based, at least in part, on the sampled RF signal; and
   a phase module that determines a slope of a Doppler curve based, at least in part, on the determined phase for the sampled RF signal for each of the plurality of different times and determines a speed of the RFID tag based, at least in part, on the slope of the Doppler curve.

10. The RFID reader of claim 9, wherein the speed of the RFID tag is determined based, at least in part, on a height of the RFID tag.

11. The RFID reader of claim 9, wherein the phase module further identifies a height of the RFID tag based, at least in part, on the sampled signal.

12. The RFID reader of claim 9, wherein the arctangent module that determines the phase of the RF signal comprises the arctangent module that estimates the phase of the RF signal for each of the plurality of different times based, at least in part, on the sampled RF signal.

13. The RFID reader of claim 12, wherein the phase of the RF signal is estimated based, at least in part, on a polynomial equation.

14. The RFID reader of claim 9, wherein the phase module that determines the slope of the Doppler curve comprises the phase module that:
   estimates the curve of the phase of the RF signal as a function of the plurality of different times; and
   determines the slope of the curve at a specific time.

15. The RFID reader of claim 14, wherein the specific time is a time that the RFID tag is moving approximately tangential to the RFID reader.

16. The RFID reader of claim 14, wherein the estimated curve is determined based, at least in part, on a least-squares method.

17. A system, comprising:
   a means for sampling a Radio Frequency (RF) signal from an RFID tag at a plurality of different times as the RFID tag approaches an RFID reader and recedes from the RFID reader;
   a means for determining a slope of a Doppler curve based, at least in part, on the determined phase for the sampled RF signal for each of the plurality of different times; and
   a means for determining a speed of the RFID tag based, at least in part, on the slope of the Doppler curve.

* * * * *